United States Patent [19]

Yamada

[11] 4,344,681

[45] Aug. 17, 1982

[54] SELECTION AND SETTING DEVICE FOR CAMERA EXPOSURE CONTROL

[75] Inventor: Seiji Yamada, Sakai, Japan

[73] Assignee: Minolta Camera Kabushiki Kaisha, Osaka, Japan

[21] Appl. No.: 238,029

[22] Filed: Feb. 25, 1981

[30] Foreign Application Priority Data

Feb. 26, 1980 [JP] Japan ................................. 55-23892

[51] Int. Cl.³ .............................................. G03B 7/08
[52] U.S. Cl. .................................... 354/38; 354/23 D
[58] Field of Search ........................ 354/23 D, 36, 38

[56] References Cited

U.S. PATENT DOCUMENTS

4,253,756  3/1981  Kurei et al. ............................. 354/38
4,286,849  9/1981  Uchidoi et al. ......................... 354/38

FOREIGN PATENT DOCUMENTS

54-138431  10/1979  Japan .

Primary Examiner—Russell E. Adams
Attorney, Agent, or Firm—Watson, Cole, Grindle & Watson

[57] ABSTRACT

In a multi-mode exposure control device for a photographic camera which automatically controls camera exposure in any desired one of diaphragm aperture priority mode, shutter speed priority mode and program mode, the selection of the exposure control mode as well as the setting of the exposure parameter to be manually determined are effected by manual operation of a single one of a plurality of manual members. A signal selector circuit receives three pairs of diaphragm control and shutter control signals for the three exposure control modes, and selects one of the pairs depending on the last operated one of diaphragm aperture setting, shutter speed setting and program mode selecting manual members. The selected pair of diaphragm control signal and shutter control signal are respectively supplied to diaphragm and shutter control circuits as well as to display devices.

7 Claims, 2 Drawing Figures

SELECTION AND SETTING DEVICE FOR CAMERA EXPOSURE CONTROL

BACKGROUND OF THE INVENTION

1. Field of the Invention

The present invention relates to camera multi-mode exposure control devices and more particularly to such devices for selecting an exposure control mode and setting exposure conditions for the multi-mode exposure control device.

2. Description of the Prior Art

Multi-mode exposure type cameras have been proposed which offer shutter-speed priority, diaphragm-aperture priority and programmed automatic exposure controls as well as manual exposure control. Such cameras automatically control diaphragm aperture, shutter speed or the combination of the two in accordance with a measured scene brightness and previously set exposure parameters, such as a shutter-speed value in the case of the shutter speed priority automatic mode, a diaphragm aperture value in the case of the diaphragm-aperture priority automatic mode, and a film speed value in the above three cases. With such multi-mode exposure type cameras, the camera operator can photograph in any desired one of the exposure control modes. The multi-mode exposure control is often employed in single lens reflex (SLR) cameras to increase their versatility.

With the diaphragm priority mode selected in such SLR cameras, the diaphragm is stopped-down to a manually preset value in response to the shutter release operation. This is followed by retraction of the reflex mirror from the photographic optical path and subsequent release of the leading shutter curtain. The trailing shutter curtain is released to start travelling after a lapse of time which is controlled in accordance with the output of a first light receiving element which in turn receives the scene or object light passed through the camera objective and reflected from the surface of the leading shutter curtain which has a reflection index that is substantially identical to that of the film surface.

When the shutter speed priority mode is selected, the light measurement is made by a second light receiving element which receives the scene light passed through the camera objective, with the diaphragm aperture stopped-down, and then reflected by the reflecting mirror. When the value of the light measurement as a function of the output of the second light receiving element reaches a predetermined value relative to a manually preset shutter speed value and the film sensitivity value, the diaphragm stopping-down operation is interrupted to thereby automatically determine the diaphragm aperture. After the reflecting mirror has retracted from the optical path, the scene light passed through the automatically determined diaphragm aperture and then reflected by the surface of the leading shutter curtain and/or film surface at the camera focal plane is measured by the first light receiving element to control the actuation of the trailing shutter curtain for exposure termination.

Further, when the programmed automatic control mode is selected, exposure operation is performed with a specific combination of a shutter speed and a diaphragm aperture that is automatically selected from a programed set or series of combinations, in accordance with a measured scene brightness and a set film sensitivity. The program for such an exposure control may be represented by a line in a graph with parameters of shutter speed, diaphragm aperture and exposure value. In the case of the manual mode, both the shutter speed and the diaphragm aperture are determined in accordance with manual settings.

Prior art multi-mode exposure control cameras generally require the camera operator to perform at least two manual operations on handling members for the mode selection and the exposure parameter setting. For example, if the camera operator wants the diaphragm-aperture priority mode, he must at first operate a mode selection member to select the diaphragm-aperture priority mode, and then operate a diaphragm setting member to select a desired diaphragm-aperture value. Additionally, prior art multi-mode exposure control cameras often require that the manual setting member, for the exposure factor that is to be controlled automatically, is set to a specific position. For example, a manual shutter speed setting member may have to be set to a specific, e.g. an automatic, position upon selection of the diaphragm-aperture priority mode wherein the shutter speed is automatically controlled in accordance with a measured scene brightness, a set film sensitivity as well as a set diaphragm aperture. Likewise, a manual diaphragm aperture setting member may have to be set to a specific position, e.g. the minimum aperture, i.e. the maximum f-number position, upon selection of the shutter speed priority mode. Even for the program mode wherein both the diaphragm aperture and the shutter speed are automatically controlled, manual operation of the diaphragm aperture and/or shutter speed setting members is often required in addition to the operation for the mode selection.

Thus, the prior art multi-mode cameras are inconvenient for handling and difficult for use, especially by amateurs and beginners, because of the complexity and troublesomeness of various selecting and setting operations, in spite of the versatility and the convenience of automatic exposure control.

One approach to simplify the operation of the multi-mode camera is proposed in a Japanese laid-open patent application No. Tokkai-Sho 54-138431, published on Oct. 26, 1979 (corresponding to a U.S. patent application Ser. No. 29,919 assigned to the same assignee as the present application). The proposed camera is provided with a mode selection member for the selection of the shutter speed priority, diaphragm aperture priority and program modes, a pair of push buttons for exposure parameter setting and another push button for resetting the exposure parameter setting. With this camera, when the diaphragm aperture priority mode is set or selected, the value of the diaphragm aperture to be manually controlled changes, for example, to a smaller or minimum aperture size i.e. maximum f-number value, in response to the operation of one of the pair of push buttons. If the other push button is operated, the diaphragm aperture value changes oppositely than that just described. If the reset button is operated with the above mentioned diaphragm setting, the set diaphragm aperture value is reset and the camera is automatically switched to the program mode. When the shutter speed priority mode is selected, the shutter speed value is set and changes in response to the operation of either of the pair of push buttons. Operation of the reset switch resets the shutter speed setting and switches the camera to the program mode. Thus, the program mode is set only by the operation of the reset button. However, the mode selection member and at least one of the push buttons have to be operated upon switching from the diaphragm aperture priority mode to the shutter speed priority mode, or vice versa. In this case, at least two manual members have to be operated.

SUMMARY OF THE INVENTION

Accordingly, the general object of the present invention is to provide a multi-mode exposure control system for a camera which is simple to operate.

Another object of the present invention is to provide a multi-mode exposure control camera wherein both the exposure control mode selection and the exposure parameter setting are made by operation of a single manual member.

Still another object of the present invention is to provide a multi-mode camera wherein exposure is automatically controlled in any desired one of the diaphragm aperture priority, shutter speed priority or program modes, and operation of one manual member causes the camera to switch to a desired control mode with the manually controlled exposure parameter being set to a desired value.

According to the present invention, the multi-mode exposure control camera is provided with two set switch members respectively for the setting of diaphragm aperture value and for the setting of shutter speed value, and a switch member for resetting the set exposure parameter and selecting the program mode such that the exposure is controlled relying on the setting by the last operated member. The camera may provide manual exposure control which may be selected by the switch member for the program mode selection and in which both the diaphragm aperture and the shutter speed are controlled in accordance with manual settings by the above set switch members.

The above and other objects and features of the invention are more fully apparent from a consideration of the following description taken in conjunction with the accompanying drawings setting forth a preferred embodiment of the best mode of carrying out the invention.

DETAILED DESCRIPTION OF THE PREFERRED EMBODIMENTS

Figure 1:
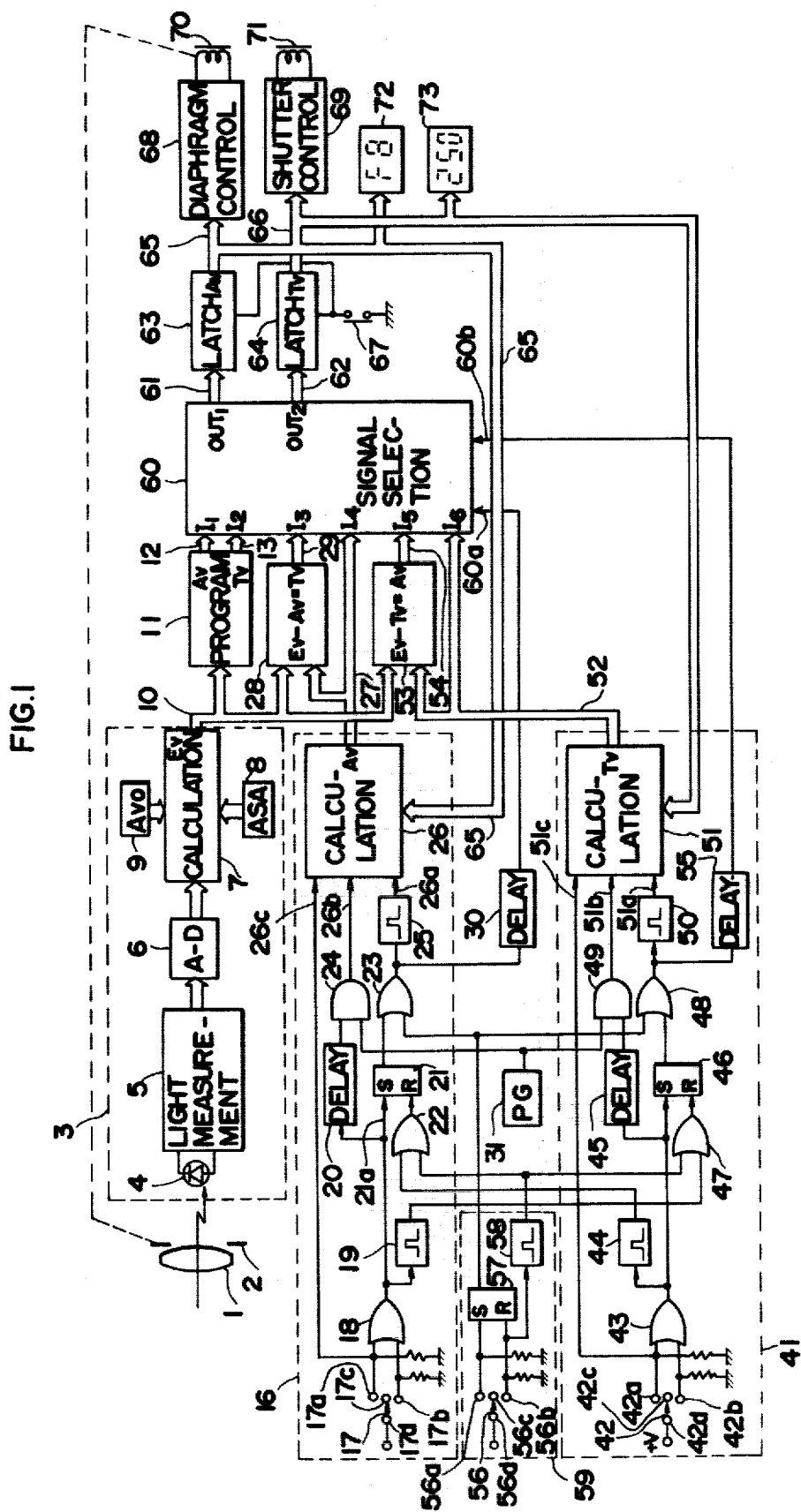
FIG. 1 is a circuit diagram of a multi-mode exposure control circuit according to an exemplary embodiment of the present invention.

With reference to FIG. 1, circuit 3 enclosed by a broken line measures scene light through objective lens 1 and aperture of diaphragm 2 and outputs at line 10 a signal representative of an exposure value Ev as a function of the measured scene light, a set film sensitivity value and the full aperture value of the lens being used. It is apparent to those skilled in the art that the exposure value Ev represents an amount of exposure given by a combination of a shutter speed and a diaphragm aperture and is defined in the APEX system as Ev=Av+Tv wherein Av is an aperture value corresponding to a diaphragm aperture, and Tv is a time value corresponding to a shutter speed. Thus, the signal at lines 10 corresponds to an amount of exposure suitable for the measured scene light and set exposure parameters. It is also to be noted that, in FIG. 1, the wide lines between or amoung the blocks and/or circuits respectively represents buses, each consisting of a plurality of lines for transmitting a digital signal.

Program circuit 11 outputs at line 12 an Av signal corresponding to a diaphragm aperture and at line 13 a Tv signal corresponding to a shutter speed, Av and Sv signals being given as a function of the Ev signal from circuit 3, in accordance with a predetermined program as to the relationship between exposure values and combinations of diaphragm aperture and shutter speed. Circuit 16, enclosed by a broken line, is adapted for registering or setting a desired diaphragm aperture value and setting the whole circuitry into the diaphragm aperture priority mode, while circuit 41 is adapted for registering or setting a desired shutter speed value and setting the whole circuitry into the shutter speed priority mode. As will be apparent from FIG. 1, circuits 16 and 41 have substantially the same construction and operate substantially in the same manner as each other with the exception that circuit 16 relates to diaphragm aperture while circuit 41 relates to shutter speed. Thus, for clarity and simplification, explanation is made hereinafter, as an example, of the diaphragm aperture value and diaphragm aperture priority mode settings.

Before circuit 16 is operated, program circuit 11 outputs signals corresponding to a specific combination of a diaphragm aperture value Av and a shutter speed value Tv as a function of the Ev signal from circuit 3. Display devices 72 and 73 show respectively the values of the diaphragm aperture and shutter speed corresponding to the signals from program circuit 11. With this condition, if movable contact 17d which is normally connected to neutral contact 17c, is connected to either contact 17a or 17b, the whole circuitry is switched to the diaphragm aperture priority mode with a desired diaphragm aperture value being set. In more detail, while movable contact 17d is being connected to either contact 17a or 17b, pulses from pulse generator 31 are applied to calculator circuit 26 in circuit 16. The Av signal generated by program circuit 11 is also supplied to calculator circuit 26 through signal selector circuit 60 and latch circuit 63. Thus, calculator circuit 26 generates at output lines 27 a signal corresponding to a diaphragm aperture value as is obtained by the subtraction or addition of ⅛ (in the sense of APEX's unit) per one pulse applied to calculator circuit 26, from or to the diaphragm value represented by the Av signal from program circuit 11. The subtraction and addition are selectively effected depending on which of contacts 17a and 17b is connected with movable contact 17d. If the camera operator, upon switching from the program mode to the diaphragm aperture priority mode, wants a larger diaphragm aperture value than the initial value given by the signal from program circuit 11 and indicated by display device 72, he should connect movable contact 17d to contact 17a. Then, calculator circuit 26 effects the addition of ⅛ per one pulse to the initial value and generates at lines 27 a signal corresponding to the result of the addition. This signal is fed to display device 72, which in turn shows an aperture value corresponding to the signal. In other words, while the camera operator connects movable contact 17d to contact 17a, the diaphragm aperture value indicated by display device 72 charges by ⅛ step to greater numbers (corresponding to smaller aperture sizes) until the camera operator, seeing a desired value in display device 72, releases movable contact 17d to return it to neutral contact 17c whereupon the pulse supply to calculator circuit 26 is stopped and a desired diaphragm aperture value is set. The output signal from calculator circuit 26, bearing the information of the changed aperture value, is also fed to calculator circuit 28 which effects subtraction of the aperture value from the exposure value output from calculator circuit 7 to obtain a time value or a shutter speed value adapted for the changed diaphragm aperture value. The signals from calculator circuits 26 and 28 are respectively transmitted to aperture control circuit 68 and shutter control circuit 71 through signal selector circuit 60 and latch circuits 63 and 64, whereby diaphragm aperture priority automatic exposure control is effected.

If movable contact 42d of switch 42 in circuit 41 is connected to either contact 42a or 42b for the shutter speed priority mode, calculator circuit 51 changes the shutter speed value given by the signal from program circuit 11 through lines 13 and 66, to a desired value by ½ per one pulse in substantially the same manner as in the case of the diaphragm aperture priority mode with circuit 16. While movable contact 42d is being connected to contact 42, pulses are supplied to calculator circuit 51 such that the shutter speed value which is presented by the output signal of calculator circuit 51 at lines 52 and which is displayed by display device 73, is increased by ½ step per one pulse applied to calculator circuit 51. Calculator circuit 53, receiving the output of calculator circuit 51, effects an exposure calculation Ev−Tv=Av with the signals from calculator circuits 7 and 51 to obtain a suitable aperture value Av for the set shutter speed value Av and the measured scene light as well as other set exposure parameters, by subtracting the Tv value (shutter speed or time value) represented by the signal from calculator circuit 51, from the Ev value represented by the signal from calculator circuit 7. The signals from calculator circuits 51 and 53 are respectively supplied to shutter and aperture control circuits 71 and 70 as well as to display devices 73 and 72 for exposure control and indication. When movable contact 42d is connected to contact 42b, calculator circuit 51 decreases the shutter speed or time value by ½ step per one pulse applied thereto. Movable contact 42d is normally connected to neutral terminal 42c.

Block 59 enclosed by a broken line and shown in the Figure between circuits 16 and 41, is for the selection of fully manual exposure control and program exposure control. When movable contact 56d of switch 56 is connected to contact 56a, both circuits 16 and 41 are brought into operative condition, whereby desired diaphragm aperture and shutter speed values can be manually set by operating movable contacts 17d and 42d in the same manner as in the case of the diaphragm aperture and shutter speed priority modes. When movable contact 56d is connected to contact 56b, the manual settings by means of calculator circuits 26 and/or 51 are overridden and signals from program circuit 11 are supplied to aperture and shutter control circuits 70 and 71 and display devices 72 and 73 whereby the program mode is restored. It is to be noted that movable contacts 17d, 42d and 56a may be spring biased to their respective neutral positions and that, once operated, the selected exposure control modes are registered in flip-flop 21, 46 or 57 and maintained until another movable contact operation. Thus, the movable contacts may not be kept connected to either of the mode selection contacts so far as the exposure control modes are concerned.

Signal selector circuit 60 is provided with diaphragm aperture signal ($A_v$ signal) and shutter speed signal ($T_v$ signal) input terminals 11 and 12 for the program mode, $A_v$ signal and $T_v$ signal input terminals 13 and 14 for the diaphragm aperture priority mode, and $A_v$ signal and $T_v$ signal input terminals 15 and 16 for the shutter speed priority mode. The signals received by signal selector circuit 60 through those input terminals are selectively output from output lines 61 and 62 relying on the combination of logic signals at control terminals 60a and 60b. Initially, i.e. upon application of power with movable contacts 17d, 42d and 56d at their respective neutral positions, or when the program mode is selected by movable contact 56d being operated temporarily, the signals at control terminals 60a and 60b are both "Low" so that the signals applied through input terminals 11 and 12 from program circuit 11 are output through output terminals 61 and 62 to control circuits 70 and 71 and display devices 72 and 73. At the same time, the output signals on output lines 61 and 62 which originate from program circuit 11, are supplied respectively to calculator circuits 26 and 51 to be changed thereby upon selection of the diaphragm aperture or shutter speed priority mode as mentioned before.

When movable contact 17d is operated for the diaphragm aperture priority mode, the logic signals at control terminals 60a and 60b are respectively "High" and "Low" to select the signal applied through input terminal 13 and 14 from calculator circuits 28 and 26. For the shutter speed priority mode, the logic signals at control terminals 60a and 60b are respectively "Low" and "High" to select the signals applied to input terminals 16 and 15 from calculator circuits 51 and 53. When their manual mode is set, the logic signals at control terminals 60a and 60b are both "High" to select signals applied to input terminals 16 and 14 from calculator circuits 26 and 51. As described hereinafter, the levels of the logic signals rely on the states of flip-flops 21, 46 and 57.

The structure and operation of the FIG. 1 circuitry will now be explained in more detail. Circuit 3 includes a photodiode 4 disposed within a camera body, as is well known per se in the art, to receive scene light to be photographed, through camera objective lens 1 and the aperture of diaphragm 2. A logarithmic compression circuit in light measurement circuit 5 generates an output signal, normally in the form of a voltage, that is proportional to the logarithm of the intensity of the light incident on photodiode 4. A-D converter 6 translates the scene-light respresentative analog signal from the logarithmic compression circuit into a digital signal which in turn is applied to calculator circuit 7. A digital signal representative of a speed value Sv (i.e. a film speed value in the APEX definition) corresponding to a set film sensitivity is also applied to calculator circuit 7 from ASA encoder 8. Further, to calculator circuit 7 is applied from Avo encoder 9 a digital signal representative of an aperture value Avo (i.e. a diaphragm aperture value in the APEX definition) corresponding to the minimum f number, i.e. the maximum diaphragm aperture size of the objective lens 1 being used. Thus, calculator circuit 7 effects the exposure calculation to obtain an exposure value Ev (also as in the APEX definition) from the speed value Sv and aperture value Avo given by encoders 8 and 9, along with a brightness value Bv (in the APEX definition) corresponding to the scene brightness detected by photodiode 4 and accordingly at the output of A-D converter 6. The exposure calculation is represented by the formula $Ev=(Bv-Avo)+Sv$, and the exposure value Ev thus obtained corresponds to an amount of exposure suitable for the detected scene brightness and the set film sensitivity. It is apparent to those skilled in the art that, as the above formula includes the factor of the maximum f number in the form of Avo, the exposure value Ev is independent of the maximum f number of the diaphragm aperture through which the scene brightness is detected. Calculator circuit 7 generates at output 10 a digital Ev signal corresponding to the exposure value Ev.

Program circuit 11 generates at outputs 12 and 13 respectively an aperture value (Av) signal and a time value (Tv) signal that respectively correspond to a diaphragm aperture and a shutter speed given in combination relying on the Ev signal from calculator circuit 7, in accordance with a predetermined program. Program circuit 11 may be constituted by a ROM (random-access memory) of a microcomputer such that the Ev signal from calculator circuit 7 designates a specific address in the ROM wherein information of a specific combination of a diaphragm aperture value (Av) and a shutter speed value (Tv) is stored. The values Av and Tv are such as given by the formula $Ev=Av+Tv$ wherein Ev is the aforementioned exposure value.

Circuit 16 includes a manually operable switch 17 having movable contact 17d which is spring biased to connect to neutral contact 17c and is connectable to either contact 17a or 17b by manual operation. To movable contact 17d is always applied a logic "High" level voltage, which will be applied to OR gate 18 through contact 17a or 17b when connected with movable contact 17d. Then, OR gate 18 outputs a "High" level signal which in turn is applied to the input terminals of one-shot circuit 19 and delay circuit 20 and to set input terminal 21a of R-S flip-flop 21. One-shot circuit 19, in response to the inversion of the output of OR gate 18 from a "Low" to a "High" level, generates a single pulse which is transmitted through OR gate 47 in circuit 41 to the reset input terminal of R-S flip-flop 46 to reset the latter and make its output "Low." Delay circuit 20, in response to the inversion of the input thereto from a "Low" level to a "High" level, outputs a "High" level signal after a lapse of a predetermined time, e.g. 1 second, from the input level inversion. It is to be noted that delay circuit 20 restores to a "Low" level without delay when the input level inverts from "High" to "Low." R-S flip-flop 21 is set to generate a "High" level signal when the output of OR gate 18 switches from a "Low" level to a "High" level at the reset condition of flip-flop 21.

Calculator circuit 26 takes in the Av signal of program circuit 11 through line 65, latch 63 and line 61, in response to a pulse from one-shot circuit 25 which is generated in response to the inversion of the output level of OR gate 23 from a "Low" to a "High" level. OR gate 23 is responsive to the output of R-S flip-flop 21. The "High" level output of delay circuit 20 is applied to one of the input terminals of AND gate 24 to unblock the gate through which pulses from pulse generator 31 are transmitted to calculator circuit 26. Pulse generator 31 is adapted to successively generate pulses at given intervals. Through line 26c a "High" or "Low" level signal is applied to calculator circuit 26 to control the latter such that either the addition or the subtraction of the aperture value is effected therein dependent on the level. For example, when movable contact 17d is connected to contact 17a, a "High" level is generated at line 26c and calculator block 26 adds ½ per one pulse from pulse generator 31, to the aperture value represented by the signal from program circuit 11 so that the output signal of calculator circuit 26 corresponds to the aperture value as the sum of the addition. When movable contact 17d is connected to contact 17b, a "Low" level signal is applied to calculator circuit 26, which subtracts ½ per one pulse, applied thereto through line 26b, from the aperture value corresponding to the previously input signal so that the output signal of calculator circuit 26 corresponds to the aperture value as the rest of the subtraction. Thus, a desired diaphragm aperture is manually set. Calculator circuit 26 may be constituted of, for example, a presettable up-down counter.

Calculator circuit 28 outputs a Tv signal representative of a time value as a result of the calculation $Tv=Ev-Av$ wherein Ev and Av are respectively the exposure value and the aperture value given by the signals from the calculator circuits 7 and 26. In other words, the time value corresponds to a shutter speed value adapted for the diaphragm aperture represented by the manually changed aperture value Av.

Circuit 41 has substantially the same structure as circuit 16 and includes one shot circuits 44 and 50, delay circuit 45, flip-flop 46 and calculator circuit 51 which respectively correspond to the elements 19, 25, 20, 21 and 26 in circuit 16. Thus, a detailed description thereof is unnecessary. It is believed to be sufficient to state that in response to the manual operation of movable contact 42d, one-shot circuit 44 generates a pulse to reset R-S flip-flop 21 in circuit 16 and that calculator circuit 51 receives time value signal Tv from program circuit 11 in response to the pulse from one-shot circuit 50 and adds or subtracts ½ per one pulse from pulse generator 31, to or from the time value represented by the previously input Tv signal whereby a desired shutter speed is manually set.

Calculator circuit 53 outputs an Av signal representative of an aperture value as a result of the calculation $Av=Ev-Tv$ wherein Ev and Tv are respectively the exposure value and the time value given by the signals from the calculator circuits 7 and 51. Thus, the aperture value corresponds to a diaphragm aperture value adapted for the shutter speed represented by the manually changed time value Tv.

Circuit 59 includes a manual switch 56 with movable contact 56d which is normally spring biased to connect to neutral contact 56 and which is manually connectable to either contact 56a or 56b. When movable contact 56d is connected to contact 56a, flip-flop 57, if it has been reset, is set to generate a "High" level signal which in turn is applied to one-shot circuits 25 and 50 through OR gate 23 or 48 so that calculator circuits 26 and 51 respectively receive the Av and Tv signals from program circuit 11 as in the case of the diaphragm aperture priority mode and the shutter speed priority mode. Thus, the aperture value and time value given by the signals are preset in respective calculator circuits 26 and 51 and can be changed independently of each other by manually operating switch 17 or 42, whereby both the diaphragm aperture and shutter speed are manually set to effect the manual mode.

When movable contact 56d is connected to contact 56b, flip-flop 57 is reset and at the same time one-shot circuit 58 generates a pulse which in turn is applied to the reset terminals of flip-flops 21 and 46 through OR gates 22 and 47 to reset the flip-flops.

From the above description, it will be easily understood that the outputs of flip-flops 21 and 46 are respectively "High" and "Low" levels in the case of the diaphragm aperture priority mode by the operation of switch 17, and "Low" and "High" levels in the case of the shutter speed priority mode by the operation of switch 42. In the case of the program mode, both outputs of flip-flops 21 and 46 are "Low" levels with the flip-flops being reset by the pulse from one-shot 58. Those output levels are transmitted through OR gate 23 or 48 and delay circuit 30 or 55 to the control lines 60a and 60b of signal selector circuit 60 for the selection of signals to be output through lines 61 and 62. In the case of the manual mode, the "High" level of flip-flop 57 is transmitted through OR gates 23 and 48, and delay circuits 30 and 55 to both input terminsl 60a and 60b. The "High" or "Low" levels on lines 60a and 60b are used to select the signals in the manner as shown in the following table 1.

TABLE 1

| MODE | 60a | 60b | OUT 1 | OUT 2 |
|---|---|---|---|---|
| PROGRAM | L | L | I1 | I2 |
| APERTURE-PRIORITY | H | L | I3 | I4 |
| SHUTTER-PRIORITY | L | H | I6 | I5 |
| MANUAL | H | H | I6 | I4 |

For example, in the case of the shutter speed priority mode where the input levels on lines 60a and 60b are respectively "Low" (L) and "High" (H), the signals input through terminals I6 and I5 are output through terminals Out 1 and Out 2.

Latch circuits 63 and 64 respectively receive the signals from the output terminals Out 1 and Out 2 through lines 61 and 62 and hold the signal while manual switch 67 is closed. Those latch circuits may also be used for storing the exposure control signals from signal selector circuit 60 while photodiode 4 is blocked from the scene light for camera exposure operation as in the case of single lens reflex cameras, wherein photodiode 4 receives scene light by way of a reflex mirror which is retracted from the photographic light path during exposure. To this end, switch 67 may be linked with the reflex mirror driving mechanism as well as may be arranged to be manually operated, or otherwise another switch may be connected in series with switch 67.

Figure 2:
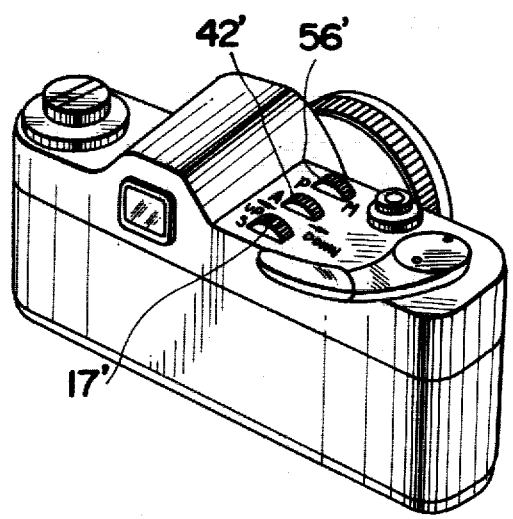
FIG. 2 is a perspective view of a camera showing an exemplary embodiment of manual members for setting the exposure control mode and exposure parameter.

Switches 17, 42 and 56 may, for example, be arranged to be operated by knobs or handles 17', 42' and 56' which are disposed on the top surface of a camera and manually slidable to the left and right, as shown in FIG. 2. Knob 17' is for the operation of diaphragm aperture priority mode setting and diaphragm aperture value setting switch 17. Knob 42' is for the shutter speed priority mode operation by switch 42, while knob 56' is for the selection of the program and manual modes. Knobs 17', 42' and 56' are biased to their neutral positions. Lock mechanisms may be provided for retaining the knobs at their left or right positions.

Control circuit 68 controls electro-magnet 70 and determines the diaphragm aperture in accordance with the signal supplied through line 65. Control circuit 69 controls electromagnet 71 for the shutter control in accordance with the signal supplied through line 66. For those control circuits, any known circuits can be employed. Display devices 72 and 73 may also be of any known structures which indicate the diaphragm aperture value and shutter speed value in digital forms, such as segment display or dot display, in for example the camera view finder field.

The overall operation of the circuitry shown in FIG. 1 is as follows. Circuits 16, 41 and 53 are arranged to be supplied with power from a power source (not shown). It is assumed that flip-flops 21, 46 and 57 are all in reset state, respectively. In this case, the circuitry is in the program mode wherein the outputs of OR gates 23 and 48 are both "Low" so that the Av signal and Tv signal from program circuit 11 are transmitted through signal selector circuit 60 and latch circuits 63 and 64 to diaphragm and shutter speed control circuits 68 and 69 as well as to display devices 72 and 73. When the camera shutter release button (shown beside knob 56' in FIG. 2) is depressed, power is supplied to light measuring or light signal generation block 3 and display devices 72 and 73 at the first stage of the shutter-release-button depression such that display devices 72 and 73 respectively indicate a diaphragm aperture value and a shutter speed value given by the signals from program circuit 11. When the shutter release button is depressed further to its second stage, an exposure operation is initiated and performed as follows. At first, switch 67 is operated by a camera mechanism such as the aforementioned mirror driving mechanism, whereby latch circuits 63 and 64 store the signals respectively applied thereto from program circuit 11. Otherwise, calculator circuit 7 may be arranged to store the Ev signal which is to be output therefrom. Anyway, after the scene-light-related signal has been stored, the diaphragm control mechanism is actuated so that the diaphragm aperture is determined by electromagnet 70, and at the same time the reflex mirror is actuated to retract from the photographic light path. Then, the shutter mechanism is actuated to expose the film for a period controlled by shutter control circuit 69.

If switch 17 is manually operated to connect movable contact 17d to contact 17a in the program mode condition, flip-flop 21 is set to output a "High" level which causes a pulse to be applied from one-shot 25 to input 26a of calculator circuit 26 so that the calculator circuit 26 receives and presets therein the Av signal supplied through line 65 from program circuit 11. If movable contact 17d is switched to neutral contact 17c before the delay time given or counted by delay circuit 20 expires, calculator circuit 26 holds the Av signal until another pulse is applied to input terminal 26a. If the connection of movable contact 17d with contact 17a is continued further, AND gate 24 is unblocked after a lapse of the delay time to pass pulses from pulse generator 31 to input terminal 26b so that the AV signal held in calculator circuit 26 is changed to represent a larger aperture value by an amount corresponding to ½ step of diaphragm aperture per one pulse applied thereto. At the same time, calculator circuit 28 outputs a signal representative of a shutter speed or a time value adapted for the changed diaphragm aperture value. These shutter speed and diaphragm aperture values are indicated by display devices 72 and 73 in the form of selectively energized dot indicators or a segment type numeral indicator indicating a corresponding exposure time with the unit in seconds and a corresponding f-number. Thus, the camera operator may continue the operation of switch 17 until a desired diaphragm aperture value, i.e. f-number, is indicated by display device 22 whereupon he should release movable control 17d by releasing knob 17' in FIG. 2. Then, he may depress the shutter release button to actuate the camera and effect the exposure in the diaphragm aperture priority mode.

If switch 42 is operated in this diaphragm aperture priority mode condition, the camera including the FIG. 1 circuitry is switched to the shutter speed priority mode. When movable contact 42d is connected to contact 42a, the output of OR gate 43 becomes "High" to set flip-flop 46 and actuate one-shot 44 whereby flip-flop 21 is reset by the pulse from one-shot 44. Thus, the outputs of OR gates 23 and 48 become respectively a "Low" and a "High" level which are respectively applied to input lines 60a and 60b such that signal selector circuit 60 selects the signals applied through input terminals I5 and I6 which are transmitted to control circuits 68 and 69 as well as to display devices 72 and 73. While movable contact 42d is being connected with contact 42a, the shutter speed or time value given by the signal in calculator circuit 51 is changed to higher values as the aperture value in the case of movable contact 17d being connected with contact 17a. If movable contact 42d is being connected with contact 42a, the shutter speed value is changed to longer or slower shutter speed. Thus, a desired shutter speed is obtained.

If switch 17 is operated to the shutter speed priority mode condition, the shutter speed priority mode condition is cleared and the diaphragm aperture priority mode is set. If movable contact 56d of switch 56 is connected with contact 56b at the shutter speed or diaphragm aperture priority mode condition, one shot 58 generates a single pulse which resets either of flip-flops 21 and 46 that has been set, so that both flip-flops 21 and 46 become reset, whereby the program mode is set. When movable contact 56d is connected to contact 56a, flip-flop 57 is set to generate a "High" level set output which is transmitted through OR gates 23 and 48 to cause calculator circuits 26 and 51 to take in the signals from latch circuits 63 and 64. While flip-flop 57 is in the set state, the data input to calculator circuits 26 and 51 can be changed independently of each other to obtain a desired diaphragm aperture value and a shutter speed value that are independent of the light measurement by circuit 3. It is to be noted that delay circuits 30 and 55 serve to cause the signal selecting operation of signal selector circuit 60 after calculstor circuit 26 and-/or 51 have received the signals from latch circuits 63 and 64. It is also apparent from the foregoing that upon switching from the diaphragm aperture priority mode to the shutter speed priority or manual mode, the initial shutter speed value received by calculator circuit 51 is not the signal from program circuit 11 but calculator circuit 28 and that has been in latch circuit 64. The same can be said in the case of switching from shutter speed priority to diaphragm aperture priority or manual mode. In case of mode switching from manual mode to diaphragm aperture or shutter speed priority mode, the signal applied to input terminal I4 or I6 will be received. Thus, any desired exposure control mode can be selected and set by the operation of a single one of three switches 17, 42 and 56. In the case of diaphragm aperture or shutter speed priority mode, even the exposure parameter can at the same time be made by the operation of the signal switch.

While a preferred embodiment of the invention has been described using specific terms, such description is for illustrative purpose only, and it is to be understood that changes, modifications and variations may be made without departing from the spirit or scope of the following claims.

What is claimed is:

1. A multi-mode camera exposure control device for controlling exposure in at least the shutter speed priority, diaphragm aperture priority and program photographic modes, comprising:

light measuring means for detecting the light from a scene to be photographed and generating a light-related output;

program control signal generator means for generating a first diaphragm value signal and a first shutter value signal as a function of said light-related output;

diaphragm aperture setting means including a first manually operative member, means for generating a second diaphragm value signal in dependence on the operation of said first manually operative member, and means for generating a first mode control signal in response to the operation of said first manually operative member;

shutter speed calculation means for generating a second shutter value signal as a function of said light-related output and said second diaphragm value signal;

shutter speed setting means including a second manually operative member, means for generating a third shutter value signal in dependence on the operation of said second manually operative member, and means for generating a second mode control signal in response to the operation of said second manually operative member;

diaphragm aperture calculation means for generating a third diaphragm value signal as a function of said light-related output and said third shutter value signal;

program mode selection means including a third manually operative member and means for generating a third mode control signal in response to the operation of said third manually operative member;

selector means for selecting one pair of said first, second and third diaphragm and shutter value signals in dependence on which of said first, second and third mode control signals is generated;

diaphragm control means for controlling the diaphragm aperture in accordance with the diaphragm control signal selected by said selector means, and shutter control means for controlling the shutter speed in accordance with the shutter control signal selected by said selector means.

2. A multi-mode camera exposure control device as claimed in claim 1 further comprising a first display means for indicating the diaphragm aperture value commensurate with said diaphragm value signal selected by said selector means and a second display means for indicating the shutter speed value commensurate with said shutter value signal selected by said selector means.

3. A multi-mode camera exposure device as claimed in claim 1 further comprising means for generating a fourth mode control signal in response to the operation of said third manually operative member, and wherein said selector means are arranged to select said second diaphragm value signal and said third shutter value signal in response to said fourth mode control signal.

4. A multi-mode camera exposure control device as claimed in claim 3 wherein said first, second and third manually operative members respectively include a switch having a movable contact selectively connectable to a neutral contact and two operational contacts, and are adapted to generate said mode control signals in response to the connection of said movable contacts with either of said operational contacts, and said means for generating the second diaphragm value signal and said means for generating the third shutter value signal respectively include a calculator means for performing exposure calculation in response to the connection of said movable contacts with either of said operational contacts.

5. A multi-mode camera exposure control device as claimed in claim 1 wherein said selector means includes selector control means coupled with said first and second control signal generation means and said program mode selection means for receiving said first, second and third mode control signals in accordance with the last received control signal, and said selector means selecting one pair of said first, second and third diaphragm shutter value signals in accordance with said selection control signal.

6. A multi-mode camera exposure control device as claimed in claim 1 wherein said selector means selects the first shutter and diaphragm value signals in accordance with a selection control signal generated in response to said third mode control signal, selects said second shutter and diaphragm value signals in accordance with a selection control signal generated in response to said first mode control signal, and selects said third shutter and diaphragm value signals in accordance with a selection control signal generated in response to the second mode control signal.

7. A multi-mode camera exposure control device as claimed in claim 5 further comprising means for generating a fourth signal in response to the operation of said third manually operative member, said selector control means being coupled with said fourth control signal generation means for receiving the fourth control signal and generating a selection control signal in response thereto such that said selection means selects the second diaphragm value signal and said third shutter value signal with the selection control signal being maintained even if said frist and second mode control signals are received.

* * * * *